Figure 10:
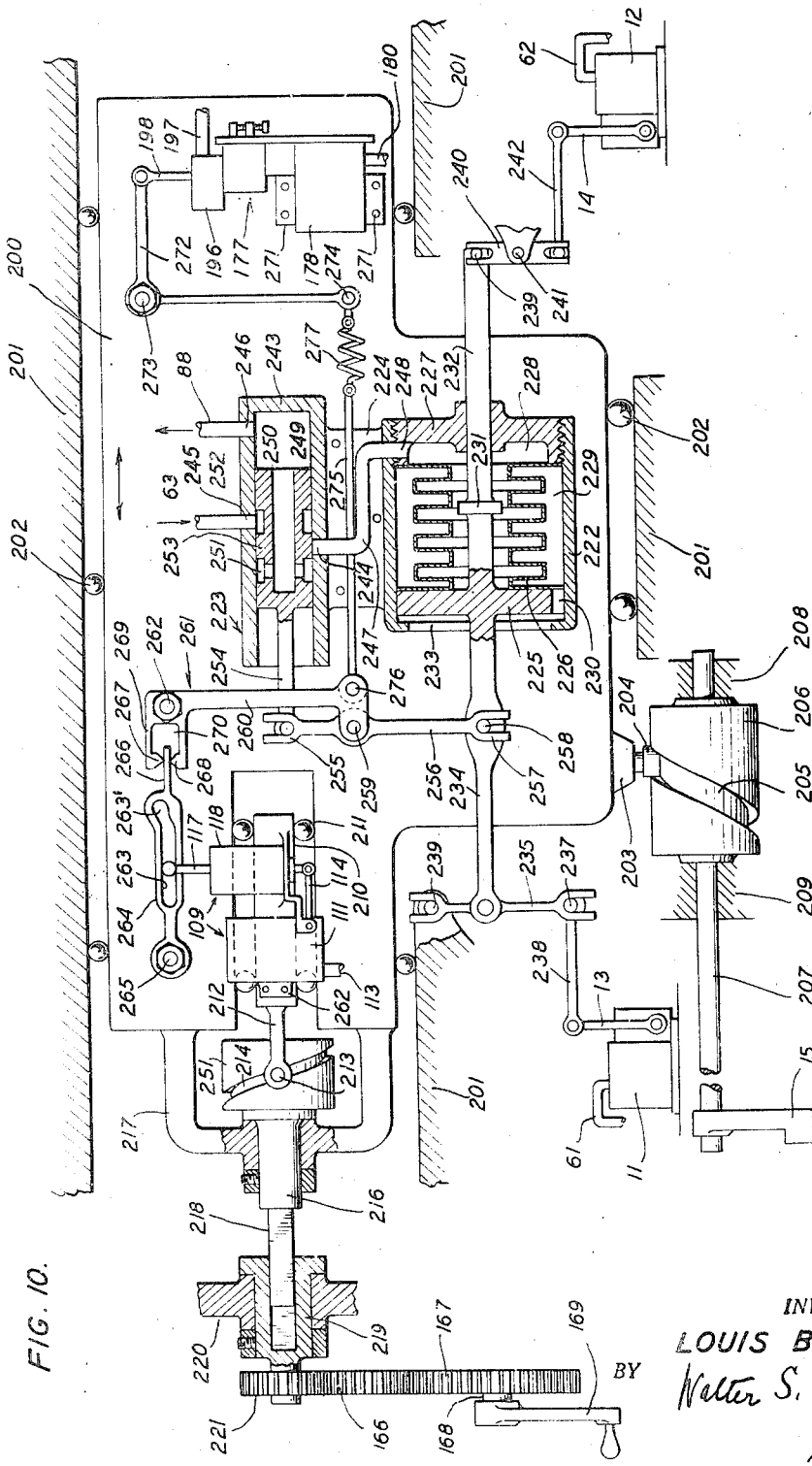

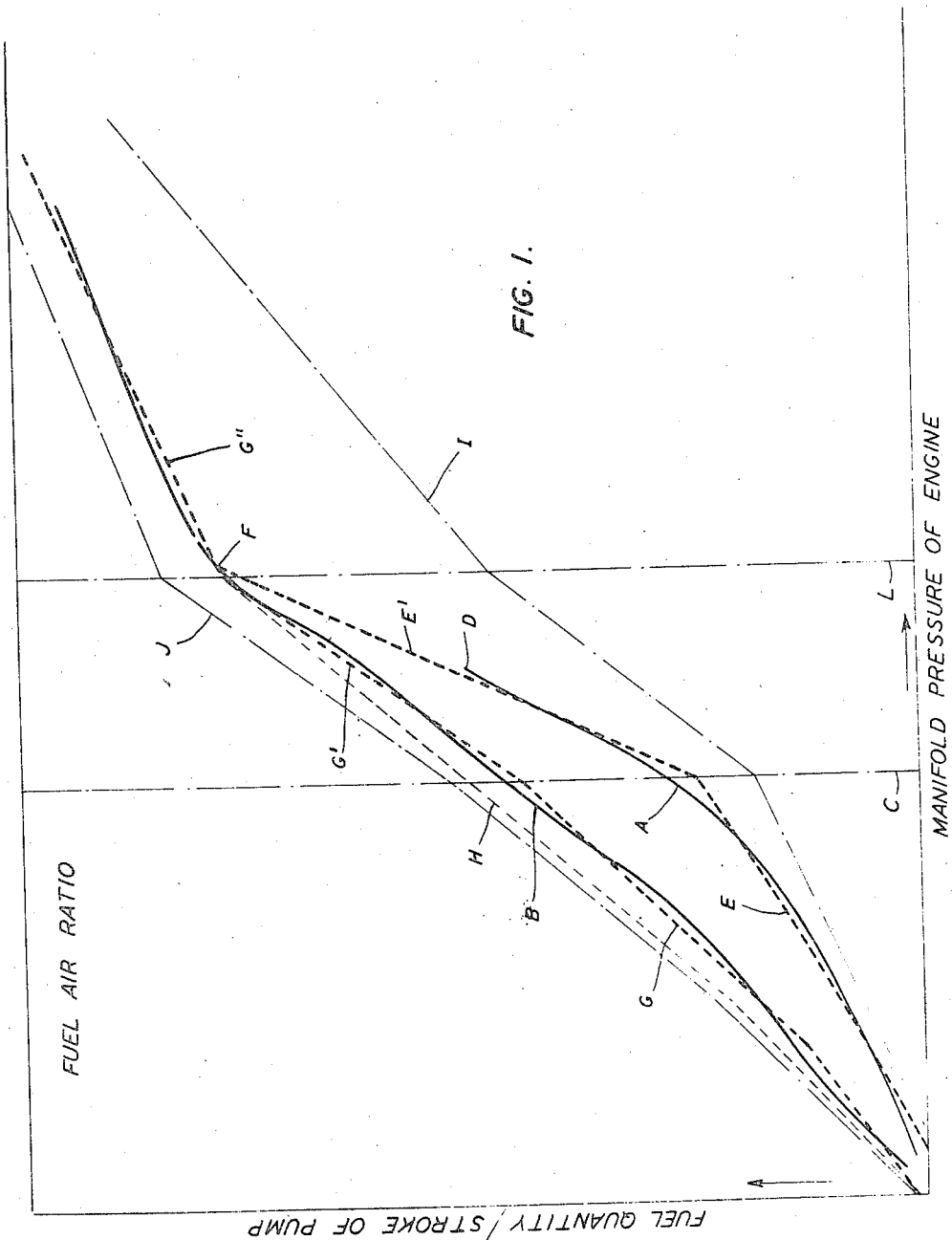

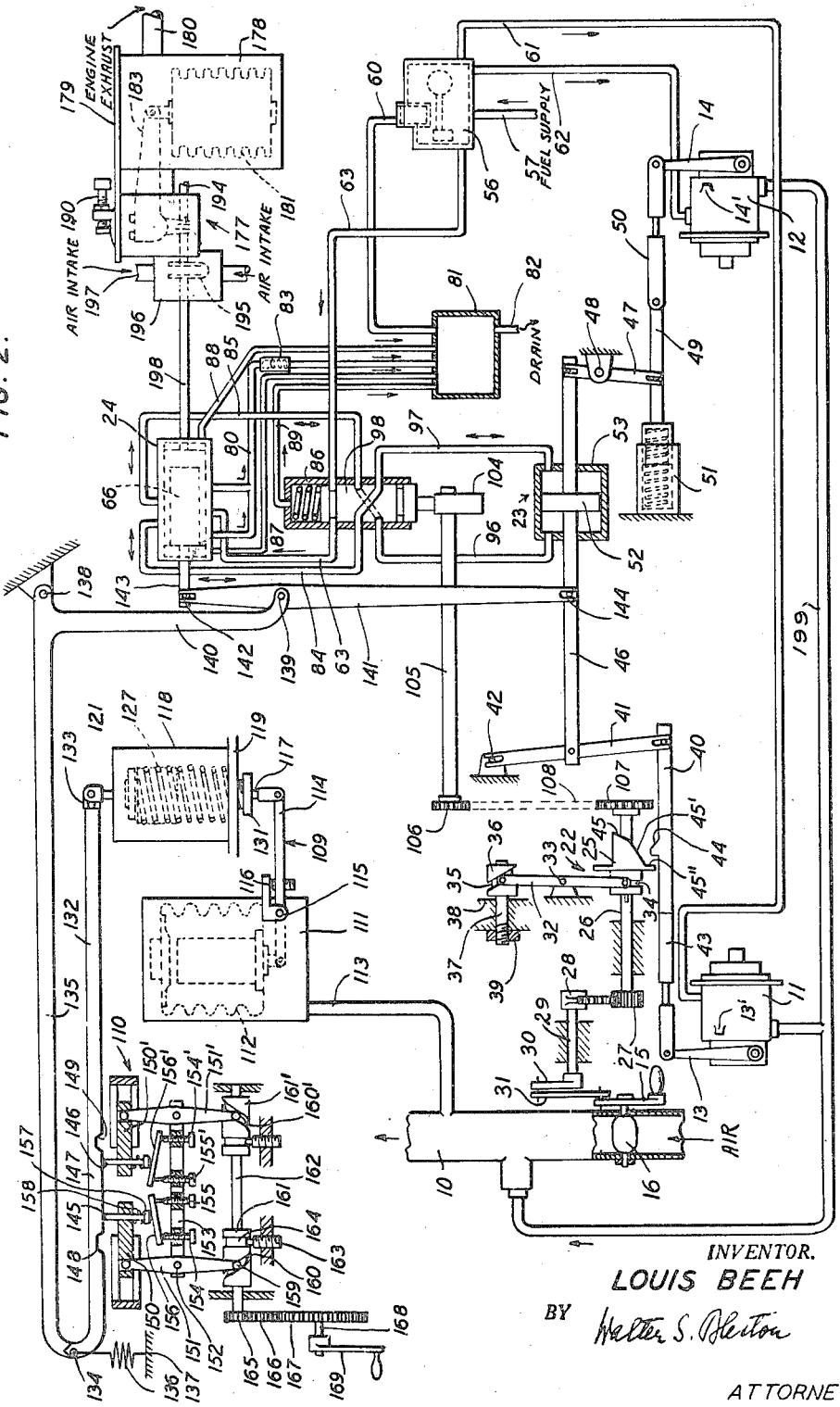

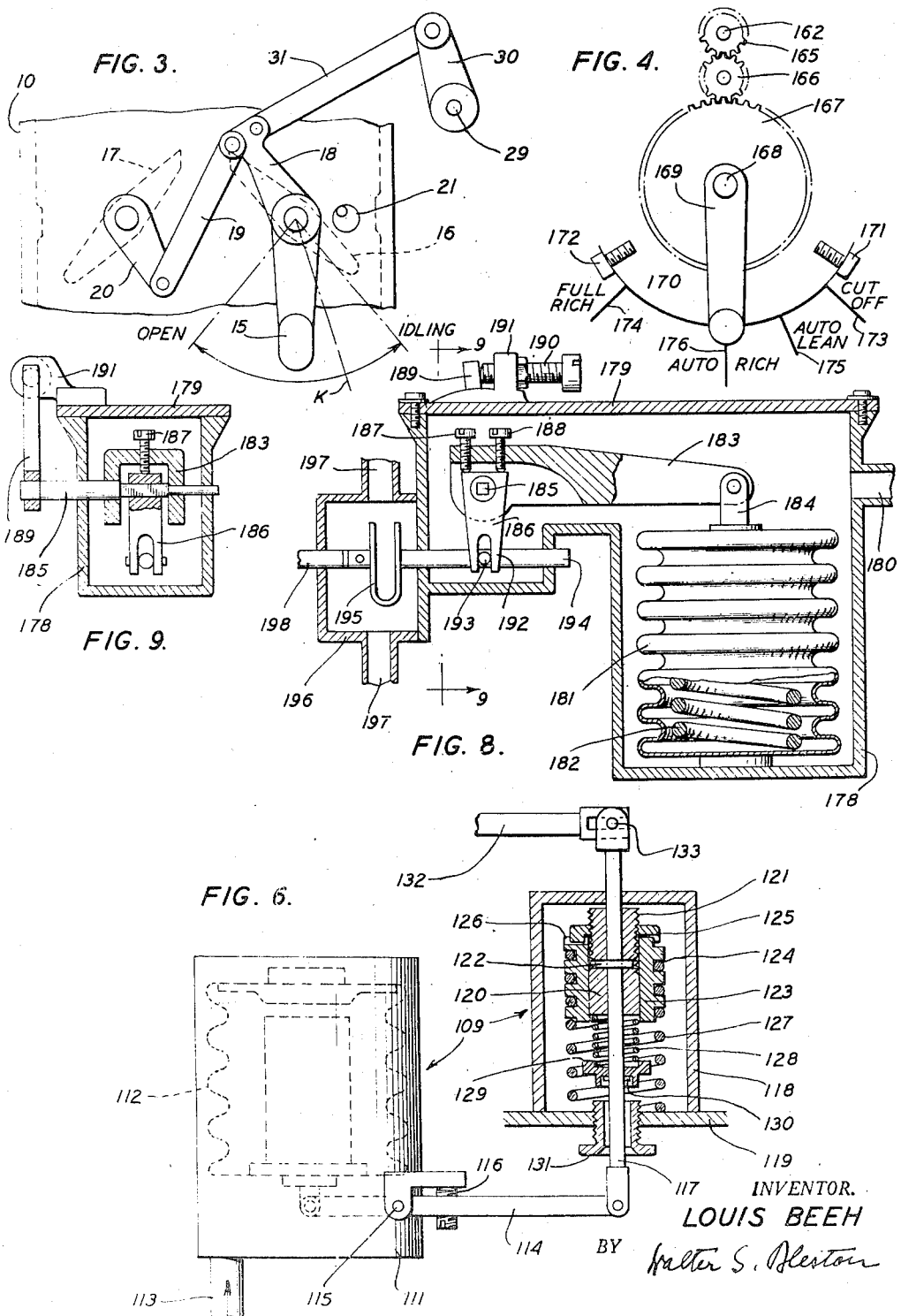

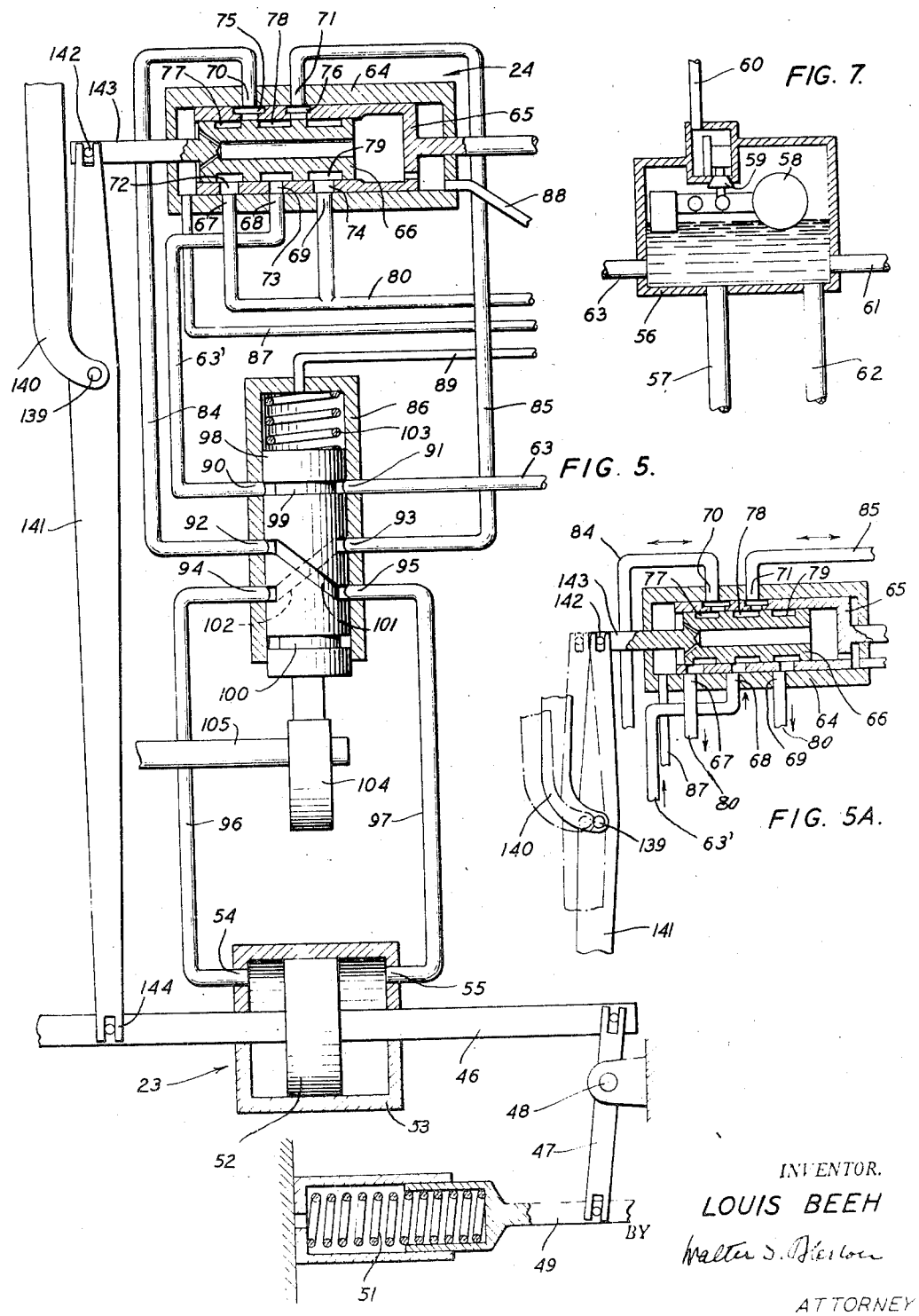

Patented Nov. 1, 1949

2,486,816

UNITED STATES PATENT OFFICE 2,486,816

FUEL MIXTURE CONTROL FOR INTERNAL-COMBUSTION ENGINES

Louis Beeh, Long Meadow, Mass., assignor to Bulova Watch Company, Inc., New York, N. Y., a corporation of New York Application August 28, 1946, Serial No. 693,429

20 Claims. (Cl. 123—103)

The invention relates to the fuel mixture control of internal combustion engines, and more particularly to an automatic mixture control according to changes of conditions under which aircraft engines operate. The apparatus for feeding such engine conventionally comprises a fuel pump frequently provided with a device which controls the delivery of the pump in response to such factors as atmospheric conditions or certain internal conditions as for instance the pressure prevailing in the intake manifold of the engine. An example of such apparatus has been disclosed in my U. S. Patent Number 2,388,462 of November 6, 1945. In order to save fuel it is also general practice to run aircraft engines at cruising speed on a lean mixture, and to feed rich mixtures only where necessary to obtain greater power output, for instance at the take off, at speeds beyond cruising speed and during other maneuvers. If a conventional device for automatic mixture control is used as above stated, the control will operate in the same manner or at the same rate regardless whether the whole feeding apparatus is set by the pilot for lean or rich mixture. However, I have found that such conventional control cannot accomplish best results from the viewpoint of gas economy. If, for instance, the theoretically correct fuel delivery per stroke over manifold pressure is plotted in a diagram once for a lean mixture and once for a rich mixture, the resulting curves show different characters in that the general inclination to the abscissa of the curve for lean mixtures within the range of usefulness is smaller than that of the curve for rich mixtures. This shows that in order to attain best results it is necessary to provide for different controlling effects for at least the two limit settings, that means for lean and full rich mixtures, or still better, for settings also between the mentioned limits.

The invention aims therefore to provide means whereby changes of lean mixtures dependent on changes of the operating conditions of an engine such as the density of the charge can be attained according to a law different from that applicable to changes of rich mixtures and in approximation of the theoretical best. Another object of the invention is the provision of means whereby the rate of action of a device responsive to changes of an engine manifold pressure on the controls of the fuel delivery can be changed according to a setting for more or less rich mixtures.

In many instances it is desired that the automatic mixture control responds not only to changes of the manifold pressure but also to changes of other conditions as for instance the intake temperature and the exhaust back pressure and/or the R. P. M. of the engine. Such factors will not basically alter the character of the afore-mentioned curves, but they will shift the curves up or down in the diagram in direct relation to such factors. In view thereof, the invention also contemplates means whereby changes of exhaust pressure and/or intake temperature and/or the R. P. M. of the engine can be introduced as corrective factors in the mentioned type of automatic mixture control system.

The invention essentially consists in a system comprising a control device for the fuel delivery of an engine, an organ responsive to pressure changes and in operative relationship to the control device and a variable transmission between the organ and the control device.

The invention also consists in the provision of another organ or organs responsive to other conditions of engine operation in a system of that type for correcting the effect of the first mentioned organ.

Further objects and details of the invention will be apparent from the description given hereinafter and the appended drawing illustrating two embodiments thereof by way of example. In the drawing, Fig. 1 is a diagram of curves illustrating the object of the invention, Fig. 2 is a diagrammatical illustration of an embodiment of the invention, Fig. 3 is an elevation of the throttle control of an engine to which the system according to Fig. 2 may be connected, Fig. 4 is a front elevation of the control lever for setting the automatic control for a desired richness of the fuel mixture, Fig. 5 is a diagrammatical cross-section on a larger scale, of a portion of the system of Fig. 2, viz. of the servo motor and its valve device in its shut-off position, Fig. 5a illustrates the same valve in active position, Fig. 6 is an enlargement of the portion of Fig. 2 showing the apparatus responsive to manifold pressure, Fig. 7 is a cross-section of the supply chamber for the servo motor device, Fig. 8 is a cross-section of the portion of Fig. 2 showing the apparatus responsive to intake temperature and exhaust pressure, Fig. 9 is a cross-section along line 9—9 in Fig. 8, and Fig. 10 is a diagrammatical illustration of a modified embodiment.

Referring now to the drawing, Fig. 1 shows, in a diagram, a set of curves of the kind hereinbefore mentioned and plotted as an example for a certain engine of the type under consideration. The curves are indicative of the fuel air ratio and give the delivery of fuel per stroke of the fuel pump over the manifold pressure. Curve A shows the theoretically best when the particular engine is operating on lean mixtures, and curve B shows the theoretically best when the engine is operating on rich mixtures. It will be noticed that the curves are close to each other, in fact they may even merge, in certain cases, at low manifold pressure. With rising pressure, however, the curves spread more and more apart up to a certain pressure, approximately of a value C, whereupon they may approach each other again. In the actual running of an aircraft engine, lean mixtures are not useful when the manifold pressure is high. For this reason curve A is not continued beyond the point D. In fact, the practically leanest mixture for pressures beyond D will be one between a theoretical minimum and a rich mixture until beyond a pressure, e. g. of a value L, only rich mixtures are useful. As stated hereinbefore, the invention aims to provide an automatic control which when set for lean mixtures will follow the curve A, and, when set for rich mixtures will follow the curve B in adjusting the fuel-air ratio by controlling the fuel delivery. Although it is actually possible by using the principle of the invention to design a structure whereby automatic changes can be caused more or less exactly according to the mentioned curves, this does not appear to be necessary. It will be sufficient to provide, in many practical instances, for a control according to a curve composed of a number of straight line sections, and I have found that an approximation of the A or B shape by a curve of only two or three straight line portions gives very satisfactory results. In view of the foregoing, the actual automatic control of lean mixtures by means of the embodiment hereinafter described, may operate according to the curve E, E' wherein the section E follows curve A rather closely up to the pressure C whereas section E' runs up much steeper to join the curve for rich mixture at the pressure F. Similarly, the actual control of rich mixtures will function according to the curve composed of the three sections G, G' and G". This curve is plotted for economically rich mixtures. However, in certain instances of aircraft operation it becomes necessary to run an engine with the highest possible degree of mixture richness, that means with full rich mixtures. A corresponding curve is plotted in Fig. 1 and denoted by H. It is located slightly higher than the curve portions G and G' and merges with G" at or near the afore-mentioned point F.

Now, in designing a control device according to the invention it is desirable that automatic changes of the fuel-air ratio can be attained not only according to the three mentioned curves for practical operation, but that the apparatus can be set for other suitable curves between the E and H curves. In other words, the apparatus should be useful to cause suitable changes for mixture settings between "lean" and "full rich." Further, in order to render the apparatus applicable to other engines than that for which the curves A and B are valid, its adjustability may be extended and may then be limited, e. g. according to the minimum curve I and the maximum curve J. The apparatus which now will be described permits such adjustability.

In the embodiment of the invention illustrated in Figs. 2 to 9, the mixture control system is shown applied to an engine of which the air inlet 10 is visible in Figs. 2 and 3. The engine is provided with two fuel pumps 11 and 12 in parallel arrangement. However, it will be understood that the control system is equally well applicable where only one pump or a plurality of pumps feed the engine. The pumps are of a type as for instance described in my U. S. Patent Number 2,388,462 of November 6, 1945, in which the delivery per stroke can be metered, and the change of fuel delivery can be attained by turning lever 13 of pump 11 and lever 14 of pump 12. The conventional delivery conduits from the pumps to the engine are indicated at 199. The engine can be controlled by means of a hand lever 15 (Figs. 2 and 3) operating the throttle which comprises two turnable plates 16 and 17 connected in conventional manner to one another and to lever 15 by the linkage members 18, 19 and 20. In idling position lever 15 bears against an adjustable abutment 21. Lever 15 may be turned from idling to fully open position of the throttle through an arc of approximately 80°, and the arrangement of the mixture control is such that through the first portion of the arc, i. e. up to a position indicated by K, fuel and air are charged according to a fixed ratio, and that through the remainder of the arc the fuel-air ration may be automatically changed. For charging at a fixed ratio, the pumps are controlled by a cam device in general denoted by 22, and for charging at automatically changed ratios by a servo motor 23 with servo valve 24. The cam device comprises the cam body 25 proper splined to a cam shaft 26 on which it is axially shiftable for adjustment. The cam shaft carries a pinion 27 which is in mesh with a toothed sector 28 keyed to a shaft 29. An arm 30 (Fig. 3) is secured to shaft 29 and connected by a rod 31 to the member 18 of the throttle links. Thus it will be clear that cam body 25 will turn together with the throttle lever 15. In order to render the cam position adjustable according to the idling position of the throttle lever, an auxiliary lever 32 is stationarily pivoted at 33, and engages with its lower end in a circumferential groove 34 of the cam body and with its upper end in a helical groove 35 of a body 36 which is fixed to a threaded bolt 37. Bolt 37 is turnable in a stationary portion 38 of the engine, and provided on its threaded end, with a stop or lock nut 39. By turning bolt 37 the upper end of the lever 32 will be shifted to the left or right, thereby shifting the cam body in the opposite direction. When the latter is in correctly adjusted position nut 39 may be tightened to insure such position. In order to control metering lever 13 of pump 11 by circumferential movement of the cam body, a rod member 40 is connected with its one end to the lever 13 and with its other end to an arm of lever 41 which has a stationary pivot at 42. A buffer 43 may be interpositioned in member 40 between its ends. A dog or nose projection 44 is integral with or secured to the rod member 40 for engagement with the cam body 25. The latter is formed with a slightly inclined end portion 45, a major and more steeply sloping portion 45', and an abutment rim 45". The cam slopes are so selected and the connection with lever 15 is so designed, that the projection 44 can engage the end portion 45 when lever 15 is in a position between idling and position K, and that the projection can engage the slope 45' when the lever is turned in clockwise direction beyond position K. In the full open position of the throttle the projection 44 may abut against the rim 45". Movement of pump lever 13 in the direction of minimum delivery is limited by an abutment 13' on the pump housing 11. Thus, in each position of the throttle lever 15, movement of the rod 40 and with it of lever 13, is restricted in the one direction by lever 13 abutting against 13' and in the other direction by projection 44 abutting against a portion of cam 25, and it will be clear from the foregoing that the delivery of the pump can be increased the more, the wider the throttle is opened. The cam control for pump 11 acts simultaneously on pump 12 through a member 46 linked to lever 41 and to another lever 47 which is pivoted at 48 and engages a rod member 49 connected to the metering lever 14 of pump 12. This rod member may be also provided with a buffer 50. A preloading means is so arranged in the system that it tends to push the rod members 40 and 49 and thus the metering levers 13 and 14 towards positions for maximum delivery. In the illustrated example this means consists of a spring 51 in connection with rod member 49, and it will be clear that this spring tends also to hold projection 44 in engagement with cam 25.

In the illustrated embodiment member 46 is also part of the mentioned servo motor device 23 (Figs. 2 and 5), in fact it is the rod of a piston 52 reciprocatable under the action of a fluid in a cylinder 53 having two ports 54 and 55 on its opposite ends respectively. As it will be explained hereinafter, this servo motor is ineffective and piston 52 can freely reciprocate in cylinder 53 while the cam device 22 is in a position where projection 44 engages slope 45. Pressure fluid of any suitable kind may be used in connection with this servo motor. As in this system a liquid fuel under pressure is available, it is most convenient to use such fuel to operate this motor. For this purpose a deaerator chamber 56 (Figs. 2 and 7) is provided receiving fuel under pressure of e. g. 17 lbs./sq. in. through an inlet 57 from a source not shown. A deaerator comprising a float 58 actuating an air valve 59 is provided to discharge air from the chamber to the atmosphere through an opening at 60 when the fuel in chamber 56 falls below a predetermined level. From this chamber, inlet pipes 61 and 62 lead to the pumps 11 and 12 respectively and another pipe 63 admits fuel to the servo valve device 24. The latter comprises a valve chamber 64 with a hollow cylindrical auxiliary slide 65 therein and a main slide 66 reciprocatable in the latter. The valve chamber is provided with five ports 67, 68, 69, 70 and 71; the auxiliary slide 65 is provided with bores 72, 73, 74, 75 and 76 respectively, registering with ports 67 to 71 when slide 65 is in its neutral position; and slide 66 is provided with three peripheral grooves 77, 78, 79. The arrangement is such that these grooves, in the neutral position of the slide 66, register with the ports 67, 68 and 69 respectively, whereas ports 70 and 71 are closed by the lands between the grooves. Port 68 is connected to the pipe 63. Both the ports 67 and 69 are connected by a pipe line 80 to a spill chamber 81 which has a drain 82 back to the fuel supply, and to which the opening 60 of the deaerator may be connected. A check valve 83 set at about 2 lbs./sq. in. may be inserted in pipe 80 to prevent air from entering the servo motor. Pipe lines 84 and 85 lead from the ports 70 and 71 respectively to another cylindrical valve chamber 86, and drains 87 and 88 connect the ends of chamber 64 with the spill chamber 81 which also communicates with the upper end of chamber 86 through a pipe 89. Chamber 86 is provided, in its side wall, with three pairs of oppositely arranged ports 90, 91 92, 93, 94 and 95. The aforementioned pipe line 63 is interrupted by the chamber 86 in that its portion leading from deaerator chamber 56 is connected to port 91 and its other portion 63' leading to valve chamber 64 is connected to port 90. The pipes 84 and 85 have their ends in the ports 92 and 93 respectively, and the ports 94 and 95 are in communication with the ports 54 and 55 respectively of the servo motor cylinder 53 through pipes 96 and 97. All the ports 90 to 95 are controlled by a plunger or slide valve 98 which is provided with two peripheral grooves 99 and 100 and two helical grooves 101 and 102, each running slightly more than half around the plunger. These grooves are so located that in the lowest plunger position shown in Figs. 2 and 5, communication is established between ports 90 and 91, between ports 92 and 95, and between ports 93 and 94. If, however, the plunger is raised to its highest position, ports 94 and 95 are connected by groove 100, whereas the ports 90, 91, 92 and 93 are closed. The plunger is loaded by a spring 103 and bears on a cam 104 secured to a shaft 105 which is in a driving connection with the cam shaft 26, for instance by means of two sprocket wheels 106 and 107 and a chain 108. The arrangement is such that the plunger is raised while cam 25 is in a position in which the dog or projection 44 engages the cam end portion 45, and that it is lowered when cam 25 is in another position, i. e. when the projection 44 is opposite the slope 45' or the abutment 45". Owing to the fact that the ports 54 and 55 of the servo motor communicate when the plunger is raised, piston 52 does not obstruct the movement of the members controlling the pumps while the projection 44 bears against the cam portion 45. On the other hand, when the plunger is lowered, piston 52 can be shifted under the control of the servo valve 24, so as to control in turn the delivery of the pumps.

The servo valve 24 is controlled by a pressure responsive device in general denoted by 109 connected with the main valve slide 66 by means of a variable transmission in general denoted by 110. The device 109 (see Fig. 6) comprises a casing 111 in which a bellows 112 is held with its upper end in a fixed position. Through a pipe 113 connected to the casing, the latter may be subjected to the manifold pressure of the engine. The lower end of the bellows is attached to a lever 114 with fulcrum 115. An adjustable abutment 116 may be provided in order to prevent excessive expansion of the bellows. The other arm of lever 114 is linked to a rod 117 movable up and down through another casing formed by a cup shaped member 118 and a stationary bottom 119. A cylindrical piece 120, externally threaded at its upper end at 121 is secured to the rod 117 by a pin 122, and a hollow cylinder 123 with an external thread groove 124 is slidably and rotatably arranged on the piece 120. A nut 125 is screwed on the threading 121 and is in adjustable engagement by means of dogs 126 with the cylinder 123. A spring 127 is screwed with some of its upper convolutions in the thread groove 124 and bears with its lower end on the casing bottom 119. By screwing more or less convolutions into the groove 124, the spring characteristic can be varied, and by screwing the nut 125 up or down the initial tension of the spring can be changed. This permits a very fine and accurate adjustment of the movement of the upper end of the rod 117 in response to varying manifold pressure. In addition another spring 128 is provided which bears against the lower face of the piece 120 and against a washer 129 shiftable on rod 117 but limited by a pin 130 in its downward movement on the latter. A hollow screw 131 through which rod 117 is passed, is screwed in the bottom 119 so as to project an adjustable distance into casing 118, and to serve as an abutment for the washer 129. Thus, when rod 117 has moved downward so far that washer 129 seats on this abutment, spring 128 becomes effective to change the characteristic of the total spring force acting on the bellows 112. It will be explained hereinafter in what manner this arrangement affects the shape of the curves in Fig. 1.

In order to transmit movement of rod 117, a floating lever 132 is linked to the rod with its end 133 slotted to allow for limited shifting. Its other end is linked at 134 to a bell crank lever 135, and a tension spring 136 attached to the link 134 and a stationary part 137 tends to hold the lever 132 in engagement with its fulcrum or fulcra which will be described hereinafter. Lever 135 is pivoted at 138 and linked at 139 with its other arm 140 to a lever 141 which engages with its upper end 142 an extension 143 of the valve slide 66 and, with its other end 144, the piston rod 46 of the servo motor 23. The engagement at both ends is effected by a pin and slot connection as clearly shown in the drawing.

If, now, lever arm 135 is for instance lowered from its position in Fig. 2, the end 139 of arm 140 will move towards the right hand side from its position shown in Fig. 5 and indicated also in dotted lines in Fig. 5a. Thereby lever 141 will be turned about its end at 144 into the position shown in solid lines in Fig. 5a, and valve member 66 will be shifted towards the right. Connection is now established between pipe lines 63' and 85 through groove 78 on the one hand, and pipe lines 80 and 84 through groove 77 on the other hand. (The cause of the shift of the slide 65 shown in Fig. 5a will be explained later.) In consequence, pressure fluid will be admitted through the port 54 to left hand side of the servo piston 52 while fluid can escape through port 55. The pressure difference forces the piston to the right. The end 144 of lever 141 will follow this movement by turning about point 139, and the lever will return the valve to its neutral position of Fig. 5 in which the flow of the pressure medium is stopped. Movement of lever arm 140 in the other direction will first move the valve slide 66 towards the left from its neutral position so as to connect pipes 63' and 84 on the one hand, and 80 and 85 on the other hand, to shift piston 52 to the left. Hence the position of the piston 52 depends on the instantaneous position of the point 139.

Means are provided to render the rate at which movement of the rod 117 is transmitted to the valve slide 66, variable and adjustable, so as to attain a change of mixture according to a desired curve selected between the limits of the curves discussed with respect to Fig. 1. Such means comprise, generally speaking, a variable and adjustable transmission of which the levers 132, 135 and 141 form parts. In the illustrated embodiment the variability is due to a movability of the fulcrum of lever 132. However, it is to be understood that other suitable and conventional types of variable transmissions may be used with similar results in connection with the invention. If in the illustrated arrangement, the fulcrum shifts along the lever 132 continuously while the lever swings, the transmission ratio will also change continuously. For the purpose of the present invention, such continuous shifting does not appear to be necessary. It is sufficient if for a desired richness of the mixture the fulcrum moves from one point to one other point while e. g. the lever end 134 is raised from its lowest to its highest position. The curve according to which the mixture thus is changed will, then, appear in the diagram of Fig. 1 as comprising two connected straight line portions of different inclination with sufficient similarity to the theoretically correct curve. If, then, the relative position of the mentioned two points in change other inclinations can be attained to change the curve according to another desired richness of the mixture. Other means which also will be described may be applied in order to attain a third straight line portion of the contemplated curve or curves.

The illustrated structure which renders such changes possible, comprises two pointed or sharp edged pins 145, 146 on which, in the position of Fig. 2, lever 132 bears with its portion 147 intermediate two recesses 148, 149. Pin 145 is axially movable in a slide 150 which in turn can be shifted at right angles to the pin by means of a lever 151 pivoted at 152 in a stationary part 153. Two adjustable screws 154, 155 penetrate the part 153 and carry, with their upper ends, a bar-like member 156 on which pin 145 rests with its head 157, a compression spring 158 being interpositioned between the head 157 and the slide 150. The lower end 159 of lever 151 engages in a spiral groove 160 of a cam member 161 secured to a shaft 162 for common rotation and prevented from axial shifting by a set screw 163 engaging in a peripheral groove 164 of the cam member. Parts similar to those associated with pin 145 are provided for pin 146 in a mirror image arrangement with respect to those of pin 145, and are respectively denoted by 151' to 152', 154' to 161'. The parts 153 and 162 are common to both pin arrangements. Now it will be clear that by turning shaft 162, the spacing of the pins 145 and 146 can be changed owing to the cooperation of the cam grooves 160, 160', levers 151, 151', and slides 150, 150'. Further, by adjusting the screws 154 and 155, and the screws 154' and 155', the inclination of the bars 156, 156', respectively may be changed whereby the pins 145 and 146 will be raised or lowered accordingly, when shifted by the slides 150, 150'. It will also be clear that lever 132, when moved downward with its end 134 from the position of Fig. 2, will be lifted from pin 146 and have the top end of pin 145 as a fulcrum, whereas the top end of pin 146 constitutes the fulcrum when the lever end 134 moves upward from the position of Fig. 2. By adjusting the pins 145 and 146 as to their spacing, i. e. by turning the shaft 162, and as to their height, i. e. by setting screws 154, 155, 154', 155' a practically infinite variety of changes of the lever fulcrum can be attained, and it is to be noted that, by no means, the inclination of the bars 156 and 156' must be the same. The arrangement and setting in the illustrated embodiment is such that the pumps 11 and 12 will deliver more fuel when the pins are shifted closer to each other, and that they will deliver less fuel when the pins are shifted farther apart. While in general the screws 154, 155, 154', 155' once correctly adjusted will not require resetting during the operation of an engine equipped with the system according to the invention, the slides 150 and 150' must be shifted whenever the operator wishes to change the richness of the fuel mixture. For this reason, a pinion 165 is secured to shaft 162 and in mesh with an intermediate wheel 166 which in turn is in engagement with a drive wheel 167. The latter is fixed on a shaft 168 which may be turned by an arm 169 (see Fig. 4). Arm 169 may be arranged opposite a stationary part 170 provided with abutments 171 and 172 for the end positions denoted by markers 173 and 174 respectively, indicated "cut off" and "full rich," and also with markers for certain intermediate positions, as for instance 175 for "auto lean," and 176 for "auto rich."

Assuming now that the fulcrum pins 145 and 146 are set at a certain distance from each other, a definite length of up or downward movement of rod 117 will cause a shorter movement of the lever end 134 when the lever swings about pin 145 as fulcrum than when it swings about pin 146. This fact causes the difference in the inclinations of e. g. the curve portions G and G', and these curve portions will be substantially straight-lined as long as the character of the load on the bellows 112, that means the character of the spring 127, does not change. Now, it has been stated hereinbefore that spring 128 becomes active when upon a downward movement of rod 117 washer 129 comes to bear on screw 131. When this happens, the force of spring 128 adds to that of spring 127, thereby changing the character of the load on bellows 112. This will cause a controlling effect according to the third curve portion G'' which is less inclined than the adjacent portion G'.

The aforementioned recesses 148 and 149 of lever 132 are so shaped and so located that when pins 145 and 146 respectively register therewith point 139 will move to an extreme right hand position in which not only piston 52 is moved into its extreme right hand position but simultaneously valve slide 66 is shifted to the right from its neutral position. In consequence there is a pressure head bearing on the left side of the piston.

In connection with the servo valve, an auxiliary slide 65 has been mentioned and described. This slide is not required if the automatic operation of the valve is desired only in response to the manifold pressure. If, however, other conditions, such as exhaust back pressure and/or intake temperature or engine R. P. M. are to be introduced as controlling factors, the auxiliary slide may be part of the means useful to perform the required corrections, and may, then, be connected with a device responsive to changes of the mentioned conditions. In Figs. 2, 8 and 9 an apparatus 177 is shown which responds to alterations of exhaust back pressure and intake temperature. This apparatus comprises a casing 178 with cover 179 and an inlet 180 which may be connected with the exhaust pipe (not shown) of the engine. A bellows 181 is mounted on the casing bottom and a spring 182 interiorly of the bellows tends to expand the latter. An arm 183 is linked to a bracket 184 on top of the bellows and rotatable on a rod 185 constituting a torsion spring. Another arm 186 is secured with its upper end to the rod 185, and two adjustment screws 187 and 188 penetrating the arm 183 and having their mating threads therein, bear against the top face of arm 186. The rod 185 projects from casing 178, on the outside of which it has a third arm 189 fixed thereto. Arm 189 extends upward and bears against an adjustment screw 190 provided in a bracket 191 on the casing cover 179. The lower end 192 of arm 186 is fork-shaped and engages a pin 193 on a shifter rod 194. The bellows 181 in connection with the mentioned springs 182 and 185 and with the adjustment screw 190 allow adjustment of the rate of shift of the rod 194 in response to a change of the exhaust back pressure prevailing in casing 178. Shifter rod 194 is fastened to one flange of a U-shaped thermometal element 195 in a chamber 196 which may be exposed to the engine intake temperature through inlets 197. The other flange of the element 195 is connected to the auxiliary valve slide 65 by means of an intermediate rod 198, and it will be clear that by means of the adjustment screws 187 and 188 the correct position of the slide 65 in relation to the bellows can be established. Owing to the described arrangement, the slide 65 will be shifted to the left side when either the intake temperature or the exhaust pressure or both increase, and to the right side when either or both decrease.

The system just described operates as follows: Prior to the start of the engine to which the mixture control unit according to the invention is applied, the bars 156 and 156' of the variable transmission device 110 are adjusted by setting screws 154, 155, 154' and 155' so that they are at the required level above the stationary part 153 and correctly inclined for the desired change of the transmission ratio. This is accomplished by trial. Similarly, the loading elements for the bellows 112 and 181 will be correctly adjusted by setting members 123, 125, 131 and 190. Lever 169 is in "cut off" position in which the pins 145 and 146 register with the recesses 148, 149 respectively. In consequence, both the piston 52 and valve slide 66 are shifted to the right as stated hereinbefore. Throttle lever 15 is in "idling" position, i. e. bearing against abutment 21 so that the throttles are closed or nearly closed. Owing to the connection between lever 15 and cam 25 through links 18, 31, 30, shaft 29, segment 28, pinion 27 and shaft 26, the cam is so turned that its face 45 is opposite projection 44 which may not yet bear on it since piston 52, in its right hand end position, holds rod 40 back with the aid of the connecting parts 46 and 41.

To start the engine, lever 169 will be turned in the position 175 for lean mixtures whereby, through the intermediary of shaft 168, wheels 167, 166, 165 and shaft 162, the cams 161 and 161' are turned so as to cause levers 151 and 151' respectively, to move the slides 150 and 150' closer to each other. Lever 132 will be raised owing to the fact that the pins leave the recesses 148 and 149 to engage the lever portion 147, and that they move upward on the inclined bars 156 and 156' respectively. The upward movement of lever 132 will shift point 139 to the left and thus permitting piston 52 and valve slide 66 to move. In consequence, spring 51 will shift the piston to the left by means of lever 47 and rod 46 until projection 44 bears on the cam slope 45, which is possible owing to the communication of both sides of the cylinder 53 through the plunger groove 100. Valve slide 66 may still be towards the right of its neutral position, but this is immaterial at this instance as the automatic control is ineffective due to the fact that the connections between the valve 24 and the servo motor cylinder are interrupted by plunger 98 which is still in its raised position.

The engine may now be started. While it is idling, the fuel delivery is controlled at a fixed rate by the cam slope 45 in engagement with projection 44, and such fixed rate prevails as long as throttle lever 15 is in any position on the right of that marked by K in Fig. 3. The running engine drives the pumps 11 and 12 and in most instances also the device furnishing the manifold pressure. Hence, as soon as the engine is started the pressure head will build up in chamber 56 from which the servo motor is to be fed, and the bellows 112 will be subjected to the existing manifold pressure according to which the fuel-air ratio of the mixture is to be controlled.

In order now to run the engine under load, say with lean mixtures, the operator will leave lever 169 on the marker 175 "auto lean," but will turn lever 15 towards "open" throttle. This brings a portion of the cam slope 45' or finally rim 45" opposite the projection 44. In this connection it is to be noted that the shape and slope 45' are so designed that the projection 44 never bears on the latter while the automatic control is properly functioning. Only if, owing to a failure of the automatic control there is no restraint against spring 51, the cam will act as an abutment to prevent excessive turning of the levers 13 and 14 and, consequently, over flooding of the engine with fuel.

Simultaneously with the last-mentioned turning of cam 104, the connection of the cam shaft 26 to cam 104 by sprockets 107 and 106, chain 108, and shaft 105, cam 104 is so turned that spring 103 pushes plunger 98 downward to the position shown in Figs. 2 and 5. The servo motor piston 52 is now under the control of valve 24 owing to the established connections of ports 92 and 95 via groove 101, and of ports 93 and 94 via groove 102. Presuming that at the instant the automatic control becomes effective, slide valve 66 is in a position slightly on the right of the neutral position as in Fig. 5a, then, groove 78 will communicate with both the ports 68 and 71, and groove 77 with both the ports 67 and 70. The connections so established permit the high pressure medium (17 lbs./sq. in.) to flow from chamber 56 through pipe 63, port 68, groove 78, port 71, pipe 85, groove 102, pipe 96, and port 54 to the left hand chamber of cylinder 53. On the other hand, the fluid from the right hand chamber can escape through port 55, pipe 97, groove 101, pipe 84, port 70, groove 77, port 67, pipe 80, check valve 83 to the low pressure chamber 81. The pressure difference will shift the piston 52 towards the right against the restraint of spring 51 so as to turn the pump metering levers 13 and 14 in positions in which the pumps deliver less fuel. The moving piston takes the lower end 144 of the lever 141 along, pulling the valve slide 66 back to the left until it reaches its neutral position in which the valve ports are closed so that the piston comes to a stand still. The position of the piston in which this occurs depends, however, on the position of the upper end of rod 117 connected to lever 132 and being subject to the manifold pressure owing to the action of the apparatus 109 as hereinbefore described. If, now, the manifold pressure changes, e. g. decreases, the bellows 112 will expand and, with the assistance of spring 127, and by means of lever 114, will push rod 117 upwards so as to turn lever 132 in counterclockwise direction about the top end of the pin 146 as a fulcrum, if and when the lever end 133 moves between its lower end position and the median position shown in Fig. 2 where the lever bears on both pins. Beyond this position and the upper end position of the end 133, lever 132 will turn about the top end of pin 145. Regardless about which pin end the lever 132 turns in counter-clockwise direction, it will cause the valve slide 66 to move towards the right when the rod 117 is raised; but the rate of shift of the slide in response to the movement of rod 117, i. e. to the change of manifold pressure, will be different, owing to the fact that the leverage of lever 132 while pin 146 serves as a fulcrum will be the quotient of the distances of that pin from the lever ends 133 and 134, whereas while pin 145 serves as the fulcrum, the leverage is the quotient of the distances of pin 145 from the lever ends. This fact is expressed in the curve E, E' of Fig. 1 by the difference in the inclinations of the upper and lower sections, and it will be clear that by using the various adjustment features described, the apparatus can be so set that the movement of the slide 66 in response to manifold pressure variations occurs according to a curve of desired character. If the manifold pressure increases, the slide is, of course, reversed according to the same laws.

The mentioned movement of the slide 66 to the right in response to a decrease of the manifold pressure will cause a shift of the piston 52 also to the right and a following return of the slide to its neutral position as hereinbefore explained. The shift of the piston to the right, however, causes a reduction of the delivery of the pumps 11 and 12. Similarly, an increase of the manifold pressure will cause a shift of piston 52 to the left and, thus, an increase of the delivery of the pumps.

In order to operate the engine with a rich mixture, the operator will turn lever 169 to any desired position between 175 and 174, e. g. "auto rich" or "full rich." Thereby pins 145 and 146 will be raised and their spacing reduced. In consequence, slide 66 will be shifted to the left causing movement of the piston 52 in the same direction so as to increase the fuel delivery. Simultaneously, the difference in the leverages when lever 132 turns on pin 145 or pin 146 as fulcrum will be increased as the distance of these fulcrums has been decreased. In consequence, the difference in the inclination of the curve sections G and G' is less than the difference in the inclination of curves E and E'. If, now, the manifold pressure increases so much that with the downward movement of the rod 117 washer 129 comes to bear on screw 131, contraction of the spring 128 will cause a change of the characteristic of the response of the bellows device with the result that fuel mixture changes occur according to the curve section G''. All the mentioned changes take place as desired in approximation of the fuel mixture curves for most economical operation of the engine for which the control is intended.

When the automatic mixture control is operative the apparatus 177 acts in a corrective capacity on the auxiliary slide 65. As hereinbefore described, the thermo-metal element 195 exposed to the intake temperature and the bellows 181 subjected to the exhaust pressure of the engine are so connected in series to the rod of the slide 65 that an increase of the temperature and of the exhaust pressure tends to shift the slide to the left, whereas a decrease will cause a shift to the right. The parts can be so adjusted for a selected mean temperature and exhaust pressure that the slide 65 is in its proper position. The slide 65 will also act in a corrective manner if one of the two, temperature and pressure, rises while the other decreases. The adjustability is attained by the provision of the torsion spring 185 which can be pretensioned by turning the screw 190. When slide 65 is in its proper position and slide 66 has assumed its neutral position, all its ports register with the corresponding ports, respectively, of the valve housing 64 so that the slide is ineffective. If, however, on account of, for instance, a rising intake temperature or exhaust pressure slide 65 is shifted slightly to the left, its port 75 will communicate with groove 77 of the main slide 66 and also with the ports 70 and 67 thereby connecting the right hand chamber of the cylinder 53 to the spill chamber 81. Simultaneously, ports 76 and 73 will connect groove 78 to ports 71 and 68, respectively, and admit high pressure to the left hand chamber of cylinder 53, thus causing a shift of the piston 52 to the right and a decrease of fuel delivery. Owing to the movement of the piston to right, slide 64 will be moved to the left as point 139 in this instance is stationary so that the lands between the grooves 77 and 78 and between 78 and 79 close again the ports 75 and 76 respectively and stop the flow of the pressure medium. It will be clear that with decreasing temperature and/or exhaust pressure, the occurring shift of the auxiliary slide 65 will cause a shift of the servo motor piston 52 to the left and thus increase of the fuel delivery.

Thus, the described system accomplishes an automatic metering control in adaptation to the requirements of an operation with varying richness of fuel mixtures and according to the prevailing conditions as to manifold pressure, intake temperature and exhaust pressure.

It will be noticed that in the embodiment just described, the mixture can be manually controlled only while the engine is idling with the throttle lever between the positions "idling" and K in Fig. 3. During the operation under load the automatic device is effective. Should this device fail for some reason or other, the pilot would not be able to control the engine and would be compelled to land. The modification, which now will be described, permits the pilot to exercise full control at all times and renders only the mixture refinement setting subject to automatic corrections. In addition to essential parts of the first embodiment, the modification diagrammatically illustrated in Fig. 10 comprises a main carriage 200 which can be shifted relatively to stationary parts 201. Rollers 202 may be interpositioned between the latter and the carriage in order to facilitate the movement. The carriage has a lower projection 203 on which another roller 204 is mounted so as to rotatable about a vertical axis and to engage a cam groove 205 of a cylindrical cam body 206 secured to a shaft 207. Shaft 207 is connected for rotation with the throttle lever 15 described with respect to the first embodiment, and the connection may be either a direct one or may be accomplished for instance in the manner shaft 29 is connected to lever 15 in Figs. 2 and 3. The shaft 207 is so journaled in stationary bearings 208 and 209 that cam body 206 is prevented from axial displacement. In consequence, if lever 15 and thus also cam body 206 will be turned, the carriage 200 will be shifted towards the left or the right depending on the direction of the turn of the lever. A secondary carriage 210 is movably mounted by rollers 211 on the main carriage so that it can be shifted in relation to the latter also from the right to the left or vice versa. The secondary carriage has an extension 212, the free end 213 of which engages in a cam groove 214 of a cylindrical cam 215 secured to a shaft 216. This shaft is journaled in a bracket 217 of the carriage 200, so that the cam 215 can be rotated but not axially shifted in relation thereto. Shaft 216 has a free end 218 which is in a spline connection with a hollow shaft 219 journaled in a stationary bearing 220 and carrying a pinion 221 which may be connected to the mixture control lever 169 of the first embodiment in the manner pinion 165 is connected to that lever in Figs. 2 and 4. Hence, a shift of the main carriage in relation to the stationary parts will not effect the position of the secondary carriage in relation to the main carriage. However, turning of pinion 221, which can be effected by turning the mixture adjustment lever 169, will cause a shift of the secondary carriage in relation to the main carriage regardless of the position of the latter.

The modification of Fig. 10 further comprises stationarily mounted pumps 11 and 12 with delivery metering levers 13 and 14, respectively, as in the case of Fig. 2, with the difference, however, that a turn of lever 13 in clockwise direction and of lever 14 in the opposite direction increases the delivery of the pumps. Also a high-pressure deaerator chamber such as 56 and a spill chamber such as 81 in Fig. 2 will be provided but are not shown in Fig. 10 in order to avoid overcrowding of that figure. However, pipe connections leading to such chambers are indicated and denoted with the reference numerals of corresponding parts in Fig. 2. The elements for the automatic control, namely the servo motor with valve, the apparatus responsive to manifold pressure, and the apparatus for applying corrections according to back pressure and intake temperature with their lever connections may be of the same type as hereinbefore described. Where modifications have been shown in Fig. 10, this has been done mainly to exemplify the possibility of applying apparatus of different and in certain instances simplified structure. However, the arrangement of these parts in Fig. 10 differs from Fig. 2 in that they are movable with the carriage 200. Thus, the servo motor cylinder 222 and the servo valve 223 are secured to the main carriage 200 by means of a bracket 224 or the like. The piston 225 of the servo motor is connected by a bellows 226 to the cylinder bottom 227 so as to form an inner chamber 228 and an outer chamber 229 communicating with the atmosphere through a vent 230. The resiliency of the bellows is such that it tends to decrease the volume of chamber 228, that means to urge the piston 225 to the right. Excessive movement in that direction is stopped by a collar 231 on piston rod 232 which penetrates the cylinder bottom 227, and an inwardly projecting flange 233 of the cylinder 222 may be provided to limit a piston movement in the opposite direction. The connection of the piston 225 to the pump levers 13 and 14 is very similar to that of Fig. 2. An extension 234 of the rod 232 engages a lever 235 the upper free end of which can swing about a stationary pivot 236, whereas its lower end 237 is linked to lever 13 by means of a connecting rod 238, and the connection of piston 225 to lever 14 is accomplished by means of the right hand piston rod end 239, engaging a lever 240 which can turn about a stationary pivot 241, and a connecting rod 242. No spring such as 51 in Fig. 2 is here required as the resilient force of the bellows 226 substitutes for an additional spring force. Owing to the mentioned structure of the servo-motor the valve 223 can be of a very simple construction with a minimum of pipe connections, which is particularly desirable in this case as all pipes leading from parts on carriage 200 to stationary parts must be flexible. Valve 223 comprises a hollow cylindrical casing 243 open on one of its ends and with three ports 244, 245, 246 in the illustrated arrangement. Port 244 is connected by a pipe 247 to a port 248 opening into the inner chamber 228 of the servo cylinder. Port 245 communicates through pipe 63 with a fluid supply chamber (not shown) such as chamber 56 in Fig. 2, under high pressure, and a pipe 88 leads to a spill chamber such as shown and denoted by 81 in Fig. 2. Interiorly of casing 243, a hollow cylindrical slide 249 is axially shiftable which is open at its end facing the closed end of the casing, so that the interior space 250 of the slide is in permanent communication with the port 246. The slide is provided with two peripheral grooves 251 and 252, of which groove 251 communicates with the space 250. The land 253 between the grooves is of a width similar to that of port 244 and the arrangement is such that in the illustrated position where land 253 closes port 244 groove 252 registers with port 245, and that land 253 closes port 245 when groove 251 registers with port 244. Thus, when slide 249 is shifted to the left from the position in Fig. 10 so that groove 252 registers partly with port 244 and partly with port 245 pressure fluid will be admitted from pipe 63 to the inner chamber 228 of the servo motor cylinder, whereas with the slide shifted to the right, the chamber 228 can be drained through groove 251, valve space 250 and pipe 88. The slide has a rod extension 254 engaging the upper end 255 of a lever 256 the lower end 257 of which engages a pin 258 on the extension 234 of the piston rod 232. Intermediate its ends, lever 256 is pivoted at 259 in the end of one arm 260 of a bell crank lever 261, which has a pivot 262 fixed to the carriage 200. It will be noticed that this lever connection between the slide 249 and the servo motor piston is very similar to that shown in Fig. 2. Lever 261 is operated by the apparatus responsive to manifold pressure. This apparatus 109 comprising as hereinbefore described, the bellows container 111 and the spring container 118 with accessorial parts among which the shift rod 117 is mounted as a unit on the secondary carriage 210 by means indicated at 262. The upper end of rod 117 engages in a longitudinal slot 263 of a lever 264 which is pivoted with one of its ends on a bolt 265 secured to the main carriage 200. The other end of lever 264 is formed by a blade-like extension 266, and, for a purpose to be explained later, the slot 263 is formed with a hump 263' at its end adjacent the extension 266. The latter is positioned between two opposite edges 267 and 268 provided at the end of the prong-shaped second arm 269 of the bell crank lever 261. The space 270 between the portions constituting the arm 269 is so large and so shaped that the end of the blade-like extension is free to move therein when the levers 264 and 261 turn about their pivots in opposite directions. The described connection constitutes a variable transmission of movement from rod 117 to bell crank lever 261, and this transmission is comparable to the system in Fig. 2 which comprises the device 110 and lever 132 acting on bell crank lever 135, 140. If, namely, rod 117 in Fig. 10 moves up or down, the movement transmitted to the bell crank lever 261 at the edged end of its arm 269 will be at a ratio according to the distance of that end from the pivot 265 over the distance of the end of rod 117 from that pivot. This last mentioned distance, however, can be varied by turning cam 215 with the aid of hand lever 169, and if the shape of the cam groove is properly selected, a suitable transmission ratio for any desired richness of fuel-air mixture can be adjusted. Furthermore, it will be noticed that during a stroke of the rod 117 at any given position of the secondary carriage in relation to the main carriage, the transmission ratio changes owing to the variation of the active length of the lever 264. This length obviously increases when lever 264 moves upward or downward from its central position in which it coincides with a straight line through the pivot centers 262 and 265. Other laws according to which a change of the lever length occurs, can be applied in many ways one of which would require merely or mainly a change of the edges 267 and 268 to cam-like curved faces on which the end portion 266 bears during a movement of lever 264.

With the instrumentality so far described, changes of the position of piston 225 can be automatically attained by means of the apparatus 109 when the pipe 113 of the bellows container 111 is connected to the intake manifold of the engine. In order to introduce the corrections according to back pressure and intake temperature, the apparatus 117 comprising the bellows container 178 and the container 196 of the temperature responsive device, is mounted on the carriage 200 by suitable means indicated at 271, the pipes 180 and 197 to be connected as stated with respect to Fig. 2. Rod 198 is linked to a bell crank lever 272 which has a fixed pivot 273 on the carriage. The other free end 274 of the bell crank lever is connected by a rod 275 to the end of lever arm 260 at 276. A spring 277 may be provided in this connection. However, such spring will be unnecessary if the torsion spring 185 (see Figs. 8 and 9) being part of the apparatus 177 has the desired characteristic. It will be noticed that both the apparatus 109 and apparatus 177 act on the same bell crank lever 261 so that the one may either increase or decrease the effect of the other depending on the conditions to which they are subjected.

In operating the modification of Fig. 10, lever 169 is turned to "cut off" position (Fig. 4), thereby cam 215 is turned so as to shift the secondary carriage far to the right in relation to carriage 200, causing the end of rod 117 to engage the hump 263' of the slot 263. This turns down lever 264 taking along bell crank lever 261 which through the connection of lever 256 and rod 254 pushes valve slide 249 to the right, thereby establishing communication between the chamber 228 of the servo motor with the drain 88 through slide groove 251 and space 250. In consequence, the spring force of the bellows 226 pulls the piston 225 to the right, i. e. in the direction in which pump delivery levers 13 and 14 are turned for increased delivery through piston rods 234 and 232, via levers 235 and 240 and connecting rods 238 and 242, respectively The movement of piston 225 swings lever 256 about pivot point 259 so that the slide 249 is returned to its neutral position shown in Fig. 10. Throttle lever 15 is now turned to "open" position for the start, thereby turning also cam 206 which causes a shift of the carriage to the right. This movement does not affect the position of the piston in relation to the carriage but its position in relation to both the levers 235 and 240. In consequence, the pump levers 13 and 14 will be turned into their positions for maximum delivery. When, now the engine is started, and the lever 15 returned to idling position, the pump delivery will be reduced as the carriage 200 is simultaneously shifted back to the left. While the engine is running under load full manual mixture control can be attained by actuating lever 15 as simultaneously the cam 206 will cause a shift of the carriage 200 in a corresponding direction. If it is, then, desired to bring the automatic mixture control into action in order to attain adjustments in response to the mentioned conditions, lever 169 may be turned to "automatic lean" or "full rich" or any intermediate position (Fig. 4) whereby cam 215 will also be turned so as to shift the secondary carriage 210 in relation to the main carriage 200, and thus also the end of rod 117 to a corresponding position in slot 263. The position of the end of rod 117 in a vertical direction, as defined by the apparatus 109 will also define the position of the point 259. A shift of this point primarily turns lever 256 about point 253 so as to push or pull the slide 249 in the same direction. The communication thereby established between the servo motor 228 and either the inlet 63 of pressure fluid or the drain 88 will cause a movement of the piston 225 also in the same direction. Thereby lever 256 is turned about point 259 so as to restore the slide 249 to neutral position as stated hereinbefore. Thus the device illustrated in Fig. 10 allows full manual control of fuel-air mixture with superimposed automatic control according to changing conditions under which the engine is running, wherein the automatic control may be switched in or out as an operator may desire.

It will be apparent to those skilled in the art that many alterations and modifications of the structure illustrated and described are possible without departure from the spirit and essence of my invention which for this reason shall not be limited but by the scope of the appended claims.

I claim:

1. A mixture control for an internal combustion engine, comprising first means adapted for connection and movement with a throttle control of the engine for which the mixture control is destined, second means adapted to actuate a metering control of the fuel delivery to the engine, third means adapted to connect said first and said second means and including resilient means tending to maintain driving connection between said first and said second means, said third means further including two members one of which being so shaped and constructed as to cause movement of the other one at a rate according to a predetermined law when the one member is moved with said first means, a device responsive to changes of pressure conditions under which said engine operates, and fourth means operative between said device and said second means to actuate said metering control according to changes of said pressure conditions independently of said third means, said fourth means being operatively connected with said resilient means and adapted to restrain the latter during said independent actuation of said metering control.

2. A mixture control for an internal combustion engine comprising first means adapted for connection and movement with a throttle control of the engine for which the mixture control is destined, second means adapted to actuate a metering control of the fuel delivery to said engine, third means adapted to connect said first and said second means, said third means including a cam movable with said first means and a cam follower movable with said second means, said cam having an active face portion for engagement by said follower over a fraction of the distance through which said throttle control is movable, a device responsive to changes of pressure conditions under which said engine operates, fourth means operative between said device and said second means to actuate said metering control according to changes of said pressure conditions, and other means in driving connection with said cam to render said fourth means inoperative while said active cam face portion is engaged by said follower and to permit operation of said fourth means when other cam portions are opposite said follower.

3. A mixture control as claimed in claim 2 further comprising resilient means included in said third means and tending to urge said follower against said cam, said fourth means being operatively connected with said resilient means and adapted to restrain the latter while said fourth means is operative, and said other cam faces being shaped as abutments for engagement by said follower to prevent excessive movement of said second means when said fourth means should fail.

4. In a mixture control for an internal combustion engine the combination of a device responsive to changes of pressure conditions under which an engine provided with the device operates, a member adapted for connection to a metering control of the fuel delivery to said engine so as to actuate said metering control, a transmission between said device and said member, said transmission including a lever connected with one of its ends to said device, and two spaced supporting members for said lever intermediate its ends, so that said lever bears on both said supporting members when in a median position and has one of said members as its fulcrum when deflected from the median position in the one direction and has the other member as its fulcrum when deflected in the other direction.

5. An apparatus as claimed in claim 4 further comprising a slide for each of said supporting members, means to adjust the height each supporting member projects from its slide, and means to shift said slides so as to vary the spacing of said supporting members.

6. In a mixture control for an internal combustion engine the combination of a device responsive to changes of pressure conditions under which an engine provided with the device operates, a member adapted for connection to a metering control of the fuel delivery to said engine so as to actuate said metering control, a transmission between said device and said member, said device including a bellows, means to subject said bellows to the manifold pressure of said engine, a first spring so arranged as to counteract resiliently contraction of the bellows, a second spring movable with said bellows, and an abutment for said second spring against which the latter bears when said bellows is contracted beyond a predetermined limit, thereby to cause beyond that limit, a different rate of bellows contraction due to changes of the manifold pressure.

7. In a mixture control for an internal combustion engine, a device adapted to be subjected to the manifold pressure of an engine to which the device is applied, and responsive to changes of said pressure, a lever pivoted intermediate its ends, said device being connected to said lever pivot so as to displace the latter in response to pressure changes, a servo motor including an element movable by a driving fluid, means including a movable organ to control said driving fluid, said controlling means being so constructed and arranged that when said organ is moved from a neutral position said servo motor element will be moved in the same direction, said organ and said element being connected to the ends of the arms of said lever respectively, whereby said organ may be returned to its neutral position when said element is shifted owing to a preceding shift of said organ, and means to transmit movement of said element to a member controlling the metering of the fuel delivery to said engine.

8. In a mixture control for an internal combustion engine, a device adapted to be subjected to the manifold pressure of an engine to which the device is applied and responsive to changes of said pressure, a servo motor including an element movable by a driving fluid, means including a movable organ to control said driving fluid, means in connection with said element and said organ to return the latter to a neutral position when said element is shifted owing to a preceding shift of said organ from its neutral position, a lever system including a lever, a plurality of fulcrum members for said lever so arranged that said lever turns about one after the other when deflected from one of its end positions into the other, and means under the control of an operator to change the position of said fulcra relatively to one another, said system being connected to said pressure responsive device and said organ to transmit movement from the former to the latter, and means to transmit movement of said element to a member controlling the metering of the fuel delivery to said engine.

9. A mixture control as claimed in claim 8, said lever system including two levers having stationary pivots, one of said levers having a forked arm, the other lever engaging between the fork prongs and being longitudinally slotted, said device including a member movable in response to pressure changes and engaging in the slot of said other lever, and means under the control of an operator to shift said device in relation to the lever pivots thereby to change the point of engagement of said member in said slot.

10. A mixture control for an internal combustion engine comprising a device responsive to changes of the manifold pressure of an engine to which the device is applied, a servo motor system including a piston shiftable by a driving fluid and a first valve to control the flow of said fluid to and from said piston, a variable transmission between said device and said valve to actuate the latter according to manifold pressure changes, means to change the transmission ratio, a second valve intermediate said first valve and said piston and having one position in which fluid can pass between the first valve and piston and a second position in which fluid can pass from the one piston side to the other, means to shift said second valve from one of said positions to the other, a member in connection with said piston and adapted for connection with a metering control of the fuel delivery to said engine to transmit movement from said piston to said metering control, a movable element adapted to engage said member so as to change the position of said piston, and driving means interconnecting said element and said second valve and adapted for connection with a throttle control of said engine, said last mentioned means being so arranged and constructed that said element is operative when said second valve is in its second position, and that it is inoperative when said second valve is in its first position.

11. A mixture control as claimed in claim 10 further comprising a spring tending to shift said piston in a direction to increase the fuel delivery, said element being a cam turnable with said throttle control and having a face portion adapted for engagement by a portion of said member under the action of said spring, and said cam face portion being in an operative position with respect to said projection when said throttle control is set for idling.

12. A mixture control as claimed in claim 10 further comprising a second device responsive to changes of conditions under which said engine operates other than changes of manifold pressure, said first valve including a valve body, a first valve slide connected to said transmission and a second slide valve intermediate said body and said first slide and connected to said second device so as to cause flow of the fluid through the valve according to the responsive actions of both said devices.

13. A mixture control for an internal combustion engine comprising a main carriage movable back and forth in a predetermined path, first means adapted for connection to and movable with a throttle control of an engine to which the mixture control is to be applied, second means in operative connection with said first means and said main carriage to shift said carriage corresponding to changes of throttle openings, an auxiliary carriage mounted on said main carriage so as to be movable with the latter and in relation thereto, means exteriorly of said carriages to shift said auxiliary carriage relatively to said main carriage, a device adapted to respond to changes of the manifold pressure of said engine, said device being mounted on said auxiliary carriage, and a variable transmission mounted on said main carriage and including an input element in connection with said device and an output element adapted for connection to an external metering control of the fuel delivery to the engine, whereby a shift of said auxiliary carriage causes a change of the transmission ratio and a shift of the main carriage causes an actuation of the metering control.

14. A mixture control as claimed in claim 13 wherein said means for shifting said auxiliary carriage comprises a first shaft, a stationary bearing for said shaft, means to turn said shaft, a cam, a cam shaft, a second bearing for said cam shaft, said second bearing being attached to said main carriage so as to be movable in conjunction therewith, a spline connection between said shafts, and a cam follower in engagement with said cam and attached to said auxiliary carriage.

15. A mixture control as claimed in claim 13 wherein said transmission includes two levers pivoted to said main carriage at a fixed distance from each other, each lever having an arm in a sliding engagement with the other one whereby the active length of one of said arms changes while the arm turns about its pivot to transmit movement to the other arm, said device including a member movable in response to pressure changes and being connected with the first mentioned arm in a sliding engagement so as to change its point of attack with respect to said arm when said auxiliary carriage is shifted in relation to said main carriage.

16. A mixture control as claimed in claim 13 further comprising a second device adapted to respond to changes of the back pressure of said engine, said second device being mounted on said main carriage and resiliently connected to said transmission so as to co-operate correctively with said device responsive to manifold pressure changes.

17. A mixture control as claimed in claim 13 further comprising an element adapted to respond to changes of the intake temperature of said engine, said element being mounted on said main carriage and resiliently connected to said transmission so as to co-operate correctively with said device responsive to manifold pressure changes.

18. A mixture control as claimed in claim 13, said transmission comprising a servo motor including a cylinder, a piston movable therein by a driving fluid, a valve casing, and an organ movable therein to control the flow of fluid from and to said cylinder, both said cylinder and said casing being mounted on said main carriage, said organ being under the control of said device responsive to manifold pressure changes, and said piston being connected to said output element.

19. In a fuel mixture control for an internal combustion engine the combination of an air throttle control operative by hand, a fuel delivery control, a device responsive to pressure conditions under which an engine provided with the mixture control operates, means in connection with said throttle control and said fuel delivery control to operate the latter according to the former at a predetermined rate, a variable transmission of movement of the pressure responsive device to said fuel delivery control, said transmission including a lever and a fulcrum member for said lever, said fulcrum member being shiftable lengthwise of said lever, and means operative by hand independently of said throttle control to shift said fulcrum member thereby to change the ratio of said transmission in order to adjust selectively the richness of the mixture of air and fuel.

20. A mixture control as claimed in claim 19 further comprising a second fulcrum member, shiftable lengthwise of said lever, said fulcrum members being so arranged that said lever turns about one after the other when deflected from one of its end positions into the other, and said hand-operative means being adapted to shift said fulcrum members relatively to one another.

LOUIS BEEH.

REFERENCES CITED

The following references are of record in the file of this patent:

UNITED STATES PATENTS

| Number | Name | Date |
| --- | --- | --- |
| 2,217,364 | Halford et al. | Oct. 8, 1940 |
| 2,341,257 | Wunsch | Feb. 8, 1944 |
| 2,374,844 | Stokes | May 1, 1945 |
| 2,383,563 | Pugh et al. | Aug. 28, 1945 |
| 2,416,797 | Dodson | Mar. 4, 1947 |
| 2,419,171 | Simpson et al. | Apr. 15, 1947 |

FOREIGN PATENTS

| Number | Country | Date |
| --- | --- | --- |
| 537,028 | Great Britain | June 5, 1941 |